US009578165B2

(12) United States Patent
Kaminogo et al.

(10) Patent No.: US 9,578,165 B2
(45) Date of Patent: Feb. 21, 2017

(54) MOBILE TERMINAL AND NON-TRANSITORY COMPUTER-READABLE RECORDING MEDIUM STORING COMPUTER-EXECUTABLE INSTRUCTIONS

(71) Applicant: KYOCERA Document Solutions Inc., Osaka (JP)

(72) Inventors: Akira Kaminogo, Osaka (JP); Yuri Moritani, Osaka (JP); Yoshihiko Arai, Osaka (JP); Masato Tanba, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/981,312

(22) Filed: Dec. 28, 2015

(65) Prior Publication Data
US 2016/0198043 A1 Jul. 7, 2016

(30) Foreign Application Priority Data

Jan. 5, 2015 (JP) .................................. 2015-000549

(51) Int. Cl.
*H04M 3/42* (2006.01)
*H04L 12/58* (2006.01)

(52) U.S. Cl.
CPC ............. *H04M 3/4217* (2013.01); *H04L 51/24* (2013.01); *H04M 3/42034* (2013.01)

(58) Field of Classification Search
CPC ............ H04M 3/4217; H04M 3/42034; H04M 1/72569; H04M 19/042; H04L 51/24
(Continued)

(56) References Cited

U.S. PATENT DOCUMENTS 6,934,536 B2  8/2005  Yoshioka
7,898,423 B2 *  3/2011  Cavanaugh ............. H04W 4/02
                                                340/539.13
(Continued)

FOREIGN PATENT DOCUMENTS

JP  H10136080 A  5/1998
JP  2001189774 A  7/2001
(Continued)

OTHER PUBLICATIONS

Notice of Reasons for Refusal mailed by Japan Patent Office on Aug. 9, 2016 in the corresponding Japanese patent application No. 2015-000549.

*Primary Examiner* — Babar Sarwar
(74) *Attorney, Agent, or Firm* — IP Business Solutions, LLC

(57) ABSTRACT

A mobile terminal includes: a storage section storing pieces of schedule information indicating respective user's schedules in which planned activities are assigned to respective scheduled dates and times; an incoming contact detection section that detects an incoming contact on the mobile terminal; a date and time information acquisition section that acquires date and time information indicating a current date and time on detection of the incoming contact; a schedule information acquisition section that acquires a piece of schedule information at a scheduled date and time based on the acquired date and time information; an alert operation attribute determining section that determines from the acquired piece of schedule information an alert operation attribute with which the planned activity is associated; and an alert operation control processing section that controls an alert operation notifying the user of the incoming contact according to the determined alert operation attribute.

5 Claims, 5 Drawing Sheets

(58) Field of Classification Search
USPC ............................... 455/404.2, 412.1–414.2, 417–420,455/41.1–41.2, 550.1, 566, 552.1, 456.1, 456.2,455/456.4, 456.3, 457
See application file for complete search history.

(56) References Cited

U.S. PATENT DOCUMENTS

| | | | |
|---|---|---|---|
| 2001/0006893 A1* | 7/2001 | Yoshioka | H04M 1/663 455/435.1 |
| 2004/0082317 A1* | 4/2004 | Graefen | H04M 1/6505 455/413 |
| 2008/0207263 A1* | 8/2008 | May | H04M 1/72566 455/556.2 |
| 2010/0093330 A1* | 4/2010 | Bluvband | H04M 1/274575 455/417 |
| 2014/0062697 A1* | 3/2014 | Ramaswamy | H04M 1/57 340/540 |

FOREIGN PATENT DOCUMENTS

| | | |
|---|---|---|
| JP | 2006115278 A | 4/2006 |
| JP | 2011-198004 A | 10/2011 |

\* cited by examiner

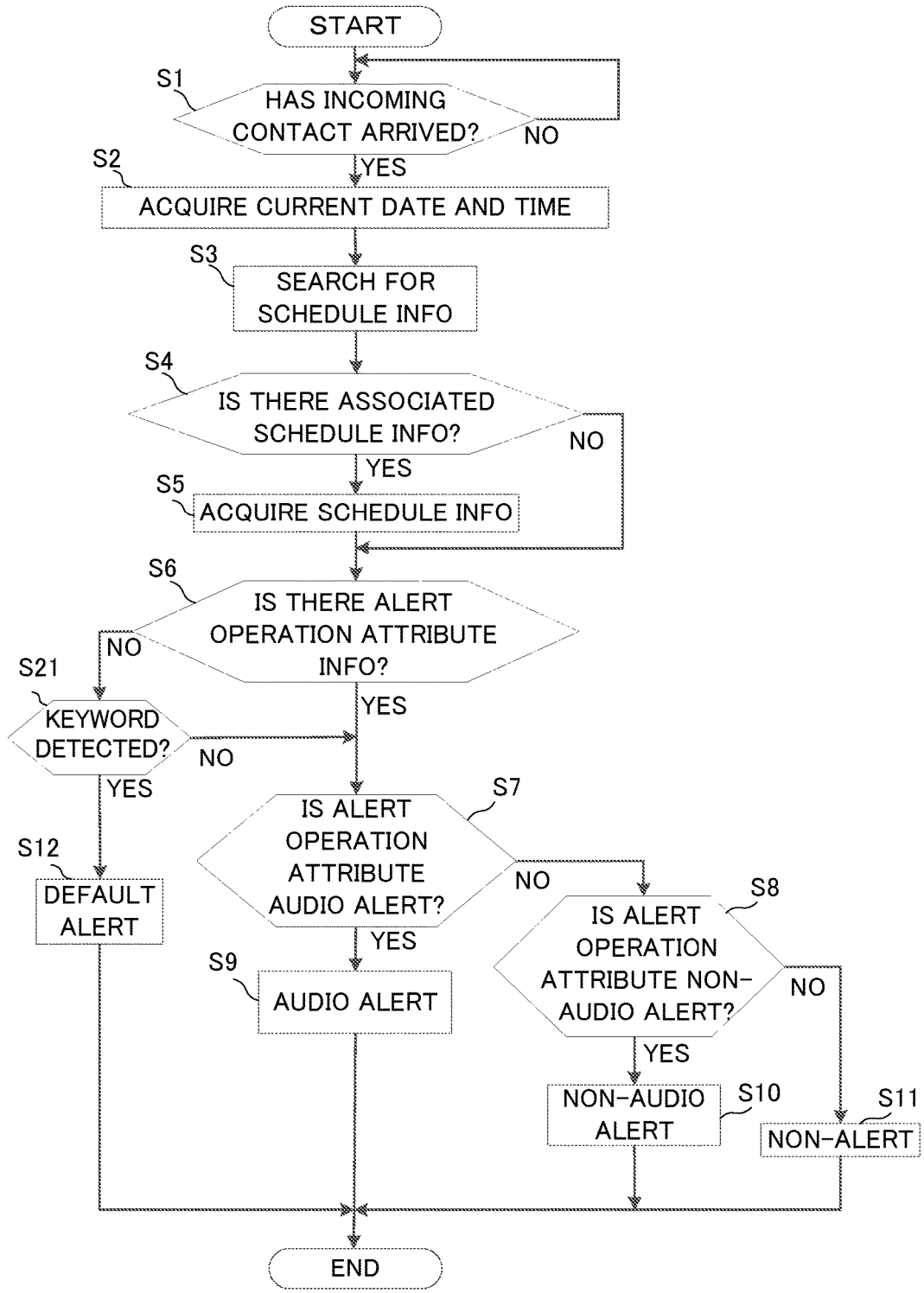

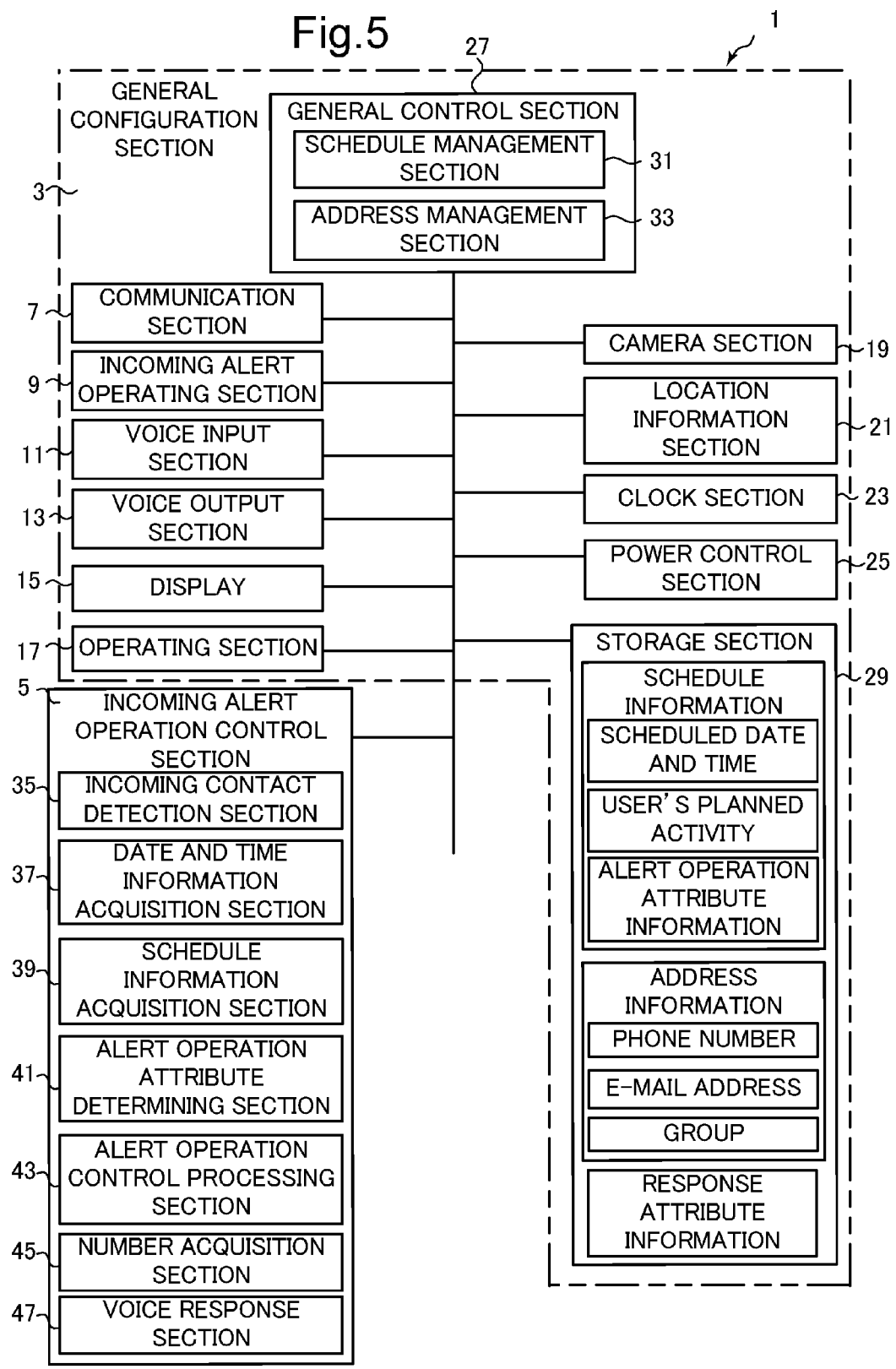

MOBILE TERMINAL AND NON-TRANSITORY COMPUTER-READABLE RECORDING MEDIUM STORING COMPUTER-EXECUTABLE INSTRUCTIONS

INCORPORATION BY REFERENCE

This application claims priority to Japanese Patent Application No. 2015-000549 filed on Jan. 5, 2015, the entire disclosure of which is incorporated herein by reference.

BACKGROUND

The present disclosure relates to mobile terminals, such as mobile phones, operable to notify their users of arrivals of incoming contacts, such as calls and e-mails, by incoming alerts with sound, vibration, and so on and non-transitory computer-readable recording media with incoming alert operation control programs recorded thereon.

A typical mobile phone as a mobile terminal, upon arrival of an incoming call or e-mail from another terminal, such as a land-line phone, a mobile phone or an information processing device, generally notifies a user of the arrival by an incoming alert with a preset ring tone, mail tone, vibration or so on.

The setting of the incoming alert operation is appropriately changed according to circumstances from the viewpoint of convenience, manners or so on by the user. For example, the volume of the ring or mail tone is controlled or the incoming alert is changed from the ring or mail tone to the vibration.

However, in the actual use of a typical mobile phone, it is very burdensome for the user to appropriately change the setting of the incoming alert operation according to circumstances and the user often forgets the setting change, so that there are many cases where the incoming alert operation being currently set is circumstantially inappropriate. Thus, an incoming alert inappropriate to a user's situation may be issued. For example, a loud ring or mail tone may be generated in situations where vibration should normally be set as the incoming alert, such as during meetings and lectures.

To avoid the above unfavorable situation, a technique is known for detecting surrounding sounds of a typical mobile phone and vibrations of the mobile phone itself and automatically select the incoming alert operation according to the user's situation recognized from the detected sounds and vibrations.

SUMMARY

A technique improved over the above technique is proposed as one aspect of the present disclosure.

A mobile terminal according to an aspect of the present disclosure includes a storage section, an incoming contact detection section, a date and time information acquisition section, a schedule information acquisition section, an alert operation attribute determining section, and an alert operation control processing section.

The storage section includes a region capable of storing pieces of schedule information indicating respective schedules of a user in which user's planned activities are assigned to respective scheduled dates and times.

The incoming contact detection section performs processing for detecting an incoming contact having arrived at the user's mobile terminal.

The date and time information acquisition section performs processing for acquiring date and time information indicating a current date and time on detection of the incoming contact.

The schedule information acquisition section performs processing for acquiring a piece of schedule information at a scheduled date and time based on and corresponding to the acquired date and time information.

The alert operation attribute determining section performs processing for determining from the acquired piece of schedule information an alert operation attribute with which the user's planned activity is associated.

The alert operation control processing section performs processing for controlling an incoming alert operation notifying the user of an arrival of the incoming contact according to the determined alert operation attribute.

Furthermore, a non-transitory computer-readable recording medium according to another aspect of the present disclosure contains an incoming alert operation control program stored thereon, the incoming alert operation control program allowing a computer to operate as the above-described incoming contact detection section, the above-described date and time information acquisition section, the above-described schedule information acquisition section, the above-described alert operation attribute determining section, and the above-described alert operation control processing section.

BRIEF DESCRIPTION OF THE DRAWINGS

FIG. 4 shows steps of processing for controlling an incoming alert operation in the mobile terminal shown in FIG. 3.

FIG. 5 shows the configuration of a mobile terminal according to Example 3 of the present disclosure.

DETAILED DESCRIPTION

An object of allowing a mobile terminal to more correctly perform an incoming alert operation appropriate to the current situation of a user is achieved by controlling the incoming alert operation according to schedule information about the user.

Example 1

[Configuration of Mobile Terminal]

Figure 1:
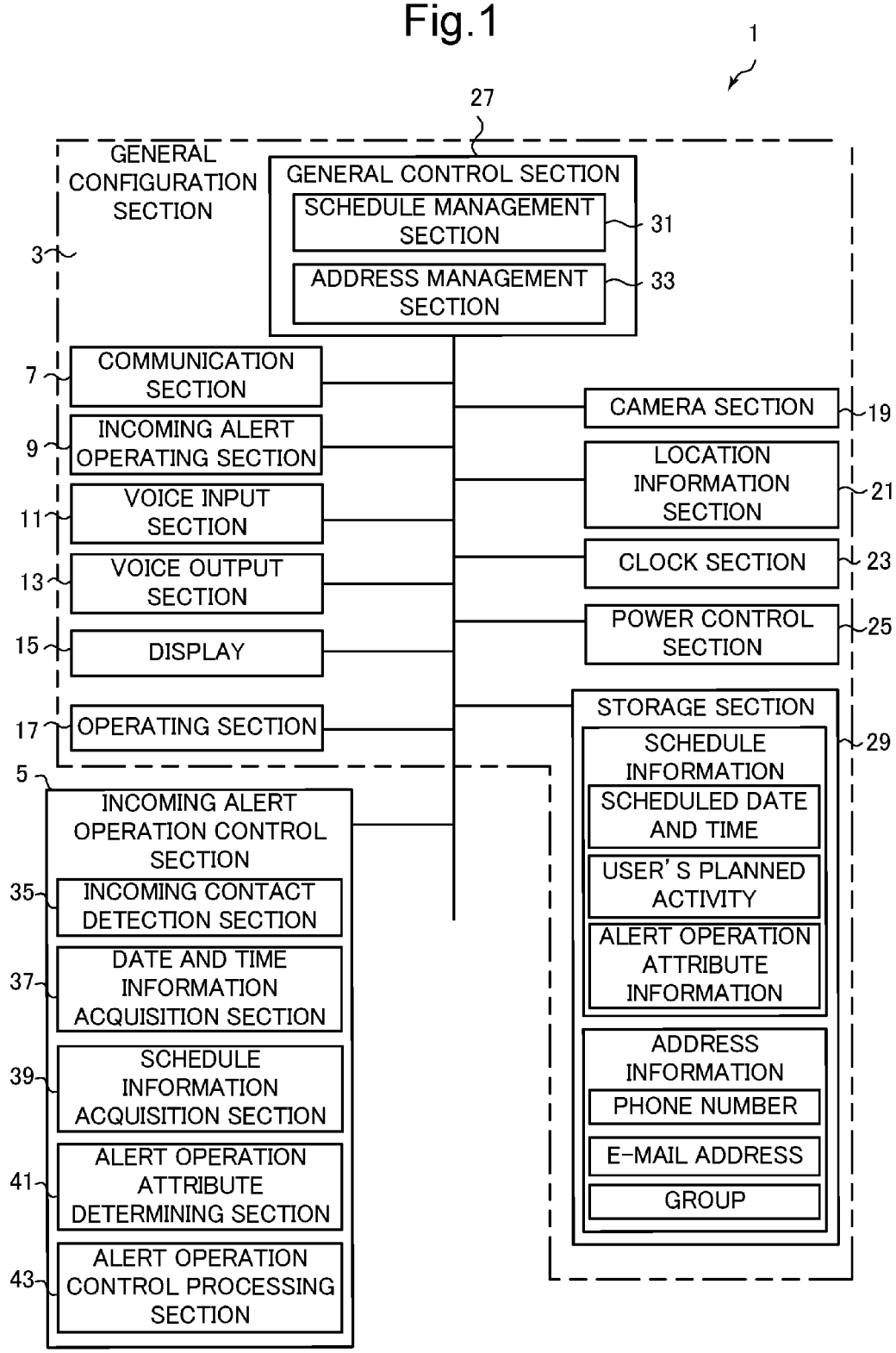
FIG. 1 shows the configuration of a mobile terminal according to Example 1 of the present disclosure.

FIG. 1 shows the configuration of a mobile terminal according to Example 1 of the present disclosure.

The mobile terminal 1 is, for example, a mobile phone such as a so-called smartphone and has general functions including a phone call function, an e-mail sending/receiving function, and a camera function. However, the mobile terminal 1 only has to have functions requiring an incoming alert, including the phone call function and the e-mail sending/receiving function, or may be an information processing device, such as a tablet terminal or a notebook computer.

The mobile terminal 1 includes a general configuration section 3 and an incoming alert operation control section 5.

The general configuration section 3 is a constituent section operable to achieve general functions of the mobile terminal 1 and includes a communication section 7, an incoming alert operating section 9, a voice input section 11, a voice output section 13, a display 15, an operating section 17, a camera section 19, a location information section 21, a clock section 23, a power control section 25, a general control section 27, a storage section 29, and so on.

The communication section 7 is an antenna module, a wireless module or like device and makes it possible to send and receive information to and from external terminals via a network, such as a mobile phone line or the Internet. In the mobile terminal 1, a call request and a call-in during calling and sending/receiving of an e-mail can be performed through the communication section 7.

The incoming alert operating section 9 includes, for example, a microphone, an electric motor, an indicator, and so on and performs an incoming alert operation under the control of a below-described incoming alert operation control section 5 upon arrival of an incoming contact at the mobile terminal 1, such as the arrival of an incoming call or the receipt of an e-mail.

The incoming alert operation in this example is performed in a mode selected from an audio alert, a non-audio alert and a non-alert. In the audio alert, a ring tone is output by the microphone or the like. In the non-audio alert, light is output from the indicator or vibration is output from the electric motor. In the non-alert, no alert is output unlike the audio and non-audio alert.

The voice input section 11 is a microphone or like device through which a voice is input and the voice output section 13 is a speaker or like device from which a voice is output. These voice input and output sections 11, 13 enable calling on the mobile terminal 1.

The display 15 is a display device, such as a liquid crystal display screen, and displays results of operations for achieving the functions of the mobile terminal 1, operating conditions, various information necessary for the operations, and so on. The operating section 17 is an operating device, such as a touch panel, a keypad and/or various switches, through which operations for achieving the functions of the mobile terminal 1 can be input. If the operating section 17 includes a touch panel, the touch panel and the display 15 form a touch panel type operating and display device.

The camera section 19 is an image pickup device, such as a digital camera, and makes it possible to take an image based on the camera function.

The location information section 21 is a positioning device using a GPS (global positioning system) or the like and makes it possible to acquire information about the location of the mobile terminal 1.

The clock section 23 is an RTC (real-time clock) and manages date and time information.

The power control section 25 is a power control device, such as a power IC (integrated circuit).

The general control section 27 is an arithmetic processing unit (computer), such as a CPU (central processing unit), and performs processing for controlling the operations of constituent sections of the mobile terminal 1. The arithmetic processing unit is a processor including one or more circuits and is capable of reading and executing various programs and capable of executing various programs previously incorporated therein. In this regard, the circuit may be an electronic component composed of a plurality of electronic elements connected via wiring or may be an electronic substrate. The general control section 27 executes programs stored in the storage section 29 to provide the general functions of the mobile terminal 1.

The storage section 29 includes a ROM (read only memory) having a region for storing various programs, a RAM (random access memory) as a workspace, and a non-volatile memory, such as a flash memory.

The storage section 29 in this example stores a schedule management program, an address management program, and an incoming alert operation control program. The schedule management program and the address management program are executed by the general control section 27 to allow the general control section 27 to operate as the schedule management section 31 and the address management section 33. The incoming alert operation control program is executed by the incoming alert operation control section 5 to be described hereinafter.

The schedule management section 31 achieves the function of managing schedules to perform processing for managing pieces of schedule information about a user. The pieces of schedule information used herein refer to pieces of information indicating respective schedules of the user in which user's planned activities are assigned to respective scheduled dates and times, and each piece of schedule information includes three subpieces of information, a "scheduled date and time", a "user's planned activity", and "alert operation attribute information". Each piece of schedule information is set by the user using the operating section 17 or so on. Furthermore, the piece of schedule information may be sent through the communication section 7 from an external terminal. The piece of schedule information is stored in the storage section 29 after being set by the user or sent from the external terminal.

The "user's planned activity" in each piece of schedule information indicates a user's activity attribute, such as "meeting" and "lecture", and is stored in the form of text data. The storage of each piece of schedule information can be done by an input operation through the operating section 17.

The "scheduled date and time" in each piece of schedule information is a subpiece of information associated with a user's activity attribute, such as "meeting" or "lecture", and indicating the date and time when the user's activity will be performed.

The "alert operation attribute information" in each piece of schedule information is a subpiece of information indicating a type or attribute of an incoming alert operation (alert operation attribute) of the mobile terminal 1. The alert operation attribute information in this example indicates which of "audio alert", "non-audio alert", and "non-alert" is the alert operation attribute. The alert operation attribute information is provided for each user's activity attribute, such as "meeting" or "lecture", and indicates which of "audio alert", "non-audio alert", and "non-alert" is the alert operation attribute of the mobile terminal 1 associated with the user's activity.

The address management section 33 achieves the function of managing addresses to perform processing for managing pieces of address information. The pieces of address information are phone numbers (identification numbers), e-mail addresses, and so on for use in issuing phone calls and sending e-mails from the mobile terminal 1 to other terminals, such as land-line phones, mobile phones, and information processing devices. The pieces of address information in this example are classified in groups according to the terminal attributes of the other terminals, such as their owners or locations of installation, and are stored in the storage section 29.

The incoming alert operation control section 5 is an arithmetic processing unit (computer) and achieves the function of controlling the incoming alert operation of the mobile terminal 1. The arithmetic processing unit is a processor including one or more circuits and is capable of reading and executing various programs and capable of executing various programs previously incorporated therein. In this regard, the circuit may be an electronic component composed of a plurality of electronic elements connected via wiring or may be an electronic substrate. The function of controlling the incoming alert operation may be selectively turned on (valid) or off (invalid) by an input operation through the operating section 17.

The incoming alert operation control section 5 executes the incoming alert operation control program in the storage section 29 in the above manner to operate as the incoming contact detection section 35, the date and time information acquisition section 37, the schedule information acquisition section 39, the alert operation attribute determining section 41, and the alert operation control processing section 43.

The incoming alert operation control program may be executed by the general control section 27. In this case, the general control section 27 doubles as the incoming alert operation control section 5. Alternatively, the incoming alert operation control section 5 may execute not only the incoming alert operation control program but also the schedule management program and the address management program. In this case, the incoming alert operation control section 5 doubles as the general control section 27.

The incoming contact detection section 35 achieves the function of detecting an incoming contact to perform processing for detecting an incoming contact, such as an incoming call or an incoming e-mail, having arrived at the mobile terminal 1. Specifically, the incoming contact detection section 35 detects, for example, the receipt of a call signal from a telephone or the receipt of data of an e-mail.

The date and time information acquisition section 37 achieves the function of acquiring date and time information to perform processing for acquiring, from the clock section 23, date and time information indicating the current date and time on detection of an incoming contact by the incoming contact detection section 35. The date and time information may be acquired using an atomic clock or the like.

The schedule information acquisition section 39 performs processing for acquiring, from the storage section 29, a piece of schedule information at a scheduled date and time based on and corresponding to the date and time information acquired by the date and time information acquisition section 37.

The alert operation attribute determining section 41 achieves the function of determining an alert operation attribute to perform processing for determining the alert operation attribute with which a user's planned activity is associated from the piece of schedule information acquired by the schedule information acquisition section 39. The alert operation attribute determining section 41 in this example performs processing for determining, from alert operation attribute information contained in the piece of schedule information, which of "audio alert", "non-audio alert", and "non-alert" is the alert operation attribute with which the user's planned activity is associated.

Furthermore, the alert operation attribute determining section 41 performs processing for determining, if the piece of schedule information contains no alert operation attribute, that the alert operation attribute is a default attribute.

Moreover, the alert operation attribute determining section 41 performs processing for determining, also when no piece of schedule information has been obtained by the schedule information acquisition section 39, that the alert operation attribute is a default attribute.

The alert operation control processing section 43 achieves the function of processing the alert operation control to perform processing for controlling, according to the alert operation attribute determined by the alert operation attribute determining section 41, an incoming alert operation notifying the user of the arrival of an incoming contact detected by the incoming contact detection section 35.

The alert operation control processing section 43 in this example performs processing for instructing the incoming alert operating section 9 to perform an incoming alert operation in the mode of the audio alert, the non-audio alert or the non-alert according to the determined alert operation attribute. Furthermore, the alert operation control processing section 43 performs, if the determined alert operation attribute is the default attribute, processing for instructing to perform an incoming alert operation according to an advance setting on the mobile terminal 1. The advance setting means that the mode of the incoming alert operation is set in advance to one of the audio alert, the non-audio alert, and the non-alert and the advance setting is made by an input operation through the operating section 17.

[Incoming Alert Operation Control]

Figure 2:
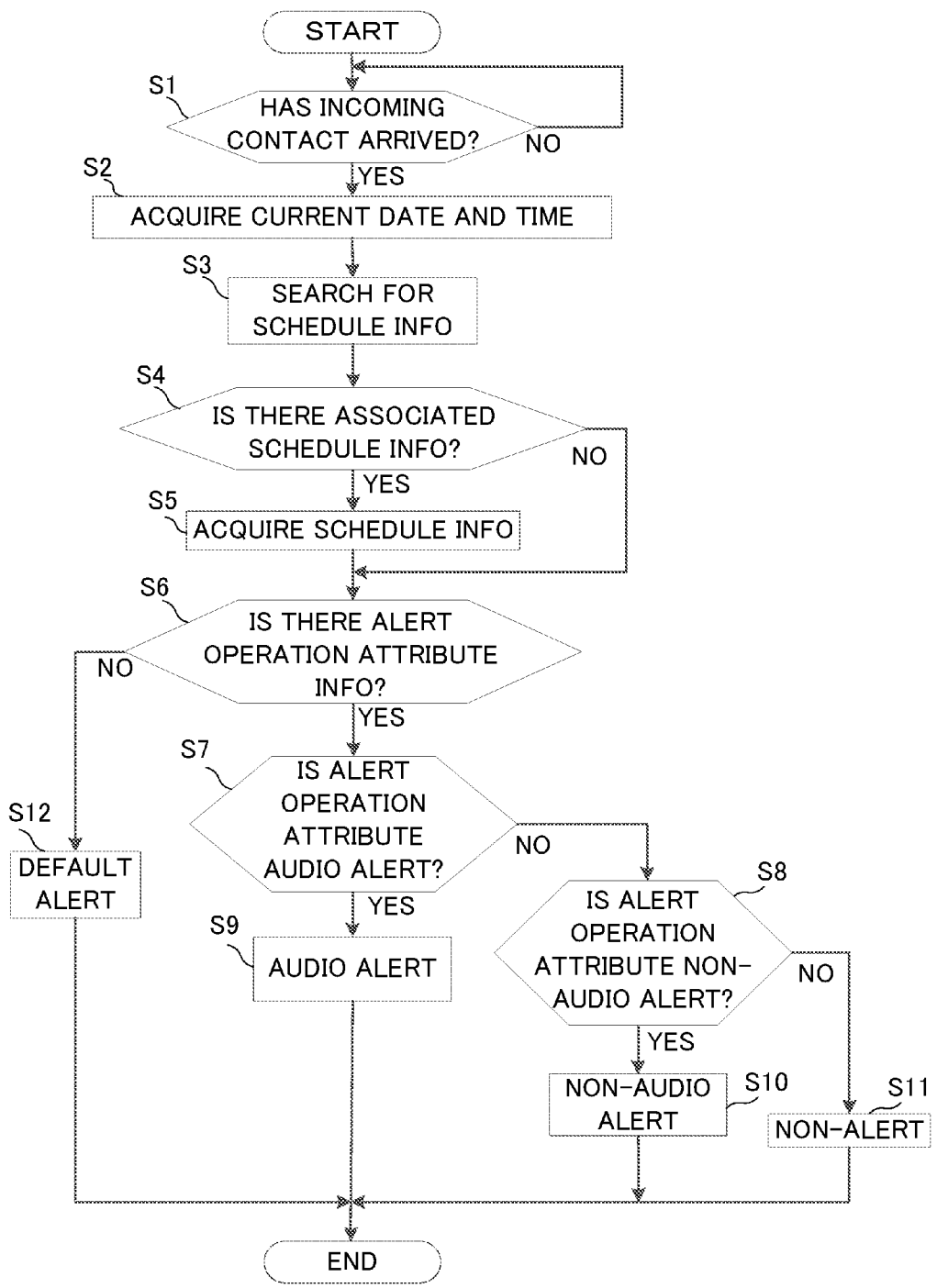
FIG. 2 shows steps of processing for controlling an incoming alert operation in the mobile terminal shown in FIG. 1.

FIG. 2 shows steps of processing for controlling the incoming alert operation in the mobile terminal 1 shown in FIG. 1.

In the processing for controlling the incoming alert operation, the processing of "HAS INCOMING CONTACT ARRIVED?" is executed in step S1. Specifically, the incoming contact detection section 35 of the incoming alert operation control section 5 determines whether or not there is a receipt of a call signal from a telephone or a receipt of data of an e-mail as an arrival of an incoming contact at the mobile terminal 1.

If an incoming contact has arrived, the process goes to step S2 (YES). If no incoming contact has arrived, the processing in step S1 is repeated (NO).

In step S2, "ACQUIRE CURRENT DATE AND TIME" is executed. Specifically, the date and time information acquisition section 37 of the incoming alert operation control section 5 acquires the current date and time from the clock section 23 of the mobile terminal 1. Thus, step S2 is completed and the process goes to step S3.

In step S3, "SEARCH FOR SCHEDULE INFO" is executed. Specifically, the schedule information acquisition section 39 of the incoming alert operation control section 5 searches from the storage section 29 for, using as a keyword the date and time information acquired in step S2, a piece of schedule information at a scheduled date and time corresponding to the acquired date and time information. Thus, step S3 is completed and the process goes to step S4.

In step S4, the processing of "IS THERE ASSOCIATED SCHEDULE INFO?" is executed. Specifically, the schedule information acquisition section 39 determines whether or not there is a piece of schedule information associated with the current date and time, from whether or not that piece of schedule information has been searched out.

If there is a piece of schedule information associated with the current date and time, the process goes to step S5 (YES). If there is no piece of schedule information associated with the current date and time, the process goes to step S6 (NO).

In step S5, "ACQUIRE SCHEDULE INFO" is executed. Specifically, the schedule information acquisition section 39 acquires from the storage section 29 the piece of schedule information searched out in step S4. Thus, step S5 is completed and the process goes to step S6.

In step S6, the processing of "IS THERE ALERT OPERATION ATTRIBUTE INFO?" is executed. Specifically, the alert operation attribute determining section 41 of the incoming alert operation control section 5 determines whether or not the piece of schedule information acquired in step S5 contains alert operation attribute information, i.e., there is alert operation attribute information about the piece of schedule information.

If there is alert operation attribute information, the process goes to step S7 (YES). If there is no alert operation attribute information, the alert operation attribute is determined to be a default attribute and the process goes to step S12 (NO). If the process goes from step S4 to step S6, no associated piece of schedule information exists and, thus, no alert operation attribute information also exists. Therefore, also in this case, the alert operation attribute is determined to be a default attribute and the process goes to step S12 (NO).

In step S7, the processing of "IS ALERT OPERATION ATTRIBUTE AUDIO ALERT?" is executed. Specifically, the alert operation attribute determining section 41 determines, based on the alert operation attribute information contained in the piece of schedule information, whether or not the alert operation attribute is "audio alert".

If the alert operation attribute is "audio alert", the process goes to step S9 (YES). If the alert operation attribute is other than "audio alert", the process goes to step S8 (NO).

In step S8, the processing of "IS ALERT OPERATION ATTRIBUTE NON-AUDIO ALERT?" is executed. Specifically, in the same manner as in step S7, the alert operation attribute determining section 41 determines, based on the alert operation attribute information, whether or not the alert operation attribute is "non-audio alert".

If the alert operation attribute is "non-audio alert", the process proceeds to step S10 (YES). If the alert operation attribute is not "non-audio alert", the alert operation attribute is determined to be "non-alert" and the process goes to step S11 (NO).

In steps S9 to S12, the mobile terminal 1 is allowed to perform an incoming alert operation according to the determined alert operation attribute.

In step S9, "AUDIO ALERT" is executed. Specifically, since the alert operation attribute is "audio alert", the alert operation control processing section 43 of the incoming alert operation control section 5 instructs the incoming alert operating section 9 of the mobile terminal 1 to perform an audio alert and thus allows the incoming alert operating section 9 to output a ring or mail tone.

In step S10, "NON-AUDIO ALERT" is executed. Specifically, since the alert operation attribute is "non-audio alert", the alert operation control processing section 43 of the incoming alert operation control section 5 instructs the incoming alert operating section 9 to perform a non-audio alert and thus allows the incoming alert operating section 9 to output light and/or vibration.

In step S11, "NON-ALERT" is executed. Specifically, since the alert operation attribute is "non-alert", the alert operation control processing section 43 of the incoming alert operation control section 5 instructs the incoming alert operating section 9 to perform a non-alert and thus allows the incoming alert operating section 9 to keep from performing any output, such as that in step S9 or S10.

In step S12, "DEFAULT ALERT" is executed. Specifically, since the alert operation attribute is the default attribute, the alert operation control processing section 43 of the incoming alert operation control section 5 instructs the incoming alert operating section 9 to operate in a default alert mode and thus allows the incoming alert operating section 9 to perform one of the audio alert, the non-audio alert, and the non-alert according to the advance setting.

After, in the above manner, the mobile terminal 1 is allowed to selectively perform an incoming alert operation according to the alert operation attribute with which the user's planned activity in the piece of schedule information is associated, the processing for controlling the incoming alert operation is terminated. The incoming alert operation is terminated by the passage of a specified time period from the start of the incoming alert operation or by a user's input operation through the operating section 17.

[Effects of Example 1]

As described previously, to solve the problem that an incoming alert inappropriate to a user's situation may be issued, a technique is known for automatically select the incoming alert operation according to the user's situation recognized from surrounding sounds of the user's mobile phone and vibrations of the mobile phone itself. However, even if the surrounding sounds have a large volume, the ring tone needs to be, in some situations, increased in volume according to the volume of the surrounding sound or, in other situations, contrariwise reduced in volume. It is difficult to appropriately distinguish among these different situations only by the surrounding sounds of the mobile phone and the vibration of the mobile phone itself. Therefore, the above technique may provide an incoming alert operation inappropriate to the user's situation.

To cope with the above problem, the mobile terminal 1 in this example includes: a storage section 29 that stores pieces of schedule information indicating respective schedules of a user in which user's planned activities are assigned to respective scheduled dates and times; an incoming contact detection section 35 that detects an incoming contact having arrived at the user's mobile terminal 1; a date and time information acquisition section 37 that acquires date and time information indicating a current date and time on detection of the incoming contact; a schedule information acquisition section 39 that acquires a piece of schedule information at a scheduled date and time based on and corresponding to the acquired date and time information; an alert operation attribute determining section 41 that determines from the acquired piece of schedule information an alert operation attribute with which the user's planned activity is associated; and an alert operation control processing section 43 that controls an incoming alert operation notifying the user of an arrival of the incoming contact according to the determined alert operation attribute.

Thus, the mobile terminal 1 in this example can more correctly perform an incoming alert operation appropriate to the user's situation based on schedule information about the user.

In the mobile terminal 1 in this example, the alert operation attribute determining section 41 determines which of "audio alert", "non-audio alert", and "non-alert" is the alert operation attribute and the alert operation control processing section 43 instructs, according to the determined alert operation attribute, to perform an incoming alert operation in the mode of the audio alert, the non-audio alert or the non-alert.

Therefore, in this example, an incoming alert operation appropriate to the user's situation can be performed in a mode correctly selected from among the audio alert, the non-audio alert, and the non-alert. The incoming alert operation in the audio alert mode can be subdivided based on the magnitude of the sound volume with specific thresholds as limits.

In the mobile terminal 1 in this example, the storage section 29 stores alert operation attribute information designated for each piece of schedule information and the alert operation attribute determining section 41 determines the alert operation attribute based on the alert operation attribute information associated with the piece of schedule information. Therefore, the mobile terminal 1 in this example can perform an incoming alert operation appropriate to the situation as desired by the user. Furthermore, although alert operation attribute information needs to be designated for each piece of schedule information, it can be designated concurrently with the setting of the piece of schedule information. Therefore, missed designation of the alert operation attribute information can be prevented, so that an incoming alert operation appropriate to the user's situation can be surely performed.

The incoming alert operation control program in this example can allow the mobile terminal 1 to achieve the functions of the constituent sections and achieve the above-described operations and effects.

[Modification]

In the mobile terminal 1 of Example 1, the alert operation attribute may be changed depending upon the terminal attributes of originating terminals, such as their owners including phone callers and e-mail senders, or their locations of installation.

The change of the alert operation attribute can be performed by the alert operation attribute determining section 41. For example, using as a keyword a phone number or an e-mail address of an originating terminal notified at the arrival, the alert operation attribute determining section 41 retrieves a corresponding piece of address information from address information in the storage section 29. The alert operation attribute determining section 41 determines the alert operation attribute as "audio alert" or "non-audio alert" according to the terminal attribute of the retrieved piece of address information.

Thus, in this modification, even, for example, in the case where it is determined from the acquired alert operation attribute information that the incoming alert operation should be performed in the non-alert mode, the incoming alert operation can be determined to be performed in the audio alert mode or the non-audio alert mode according to the terminal attribute of the originating terminal, so that the user can be surely notified of the arrival of an incoming contact.

Therefore, this modification can deal with the case where it is necessary to surely notify the user of the arrival of a phone call or an e-mail, for example, the case where the owner of an originating terminal is a user's superior or the like at work.

Example 2

Figure 3:
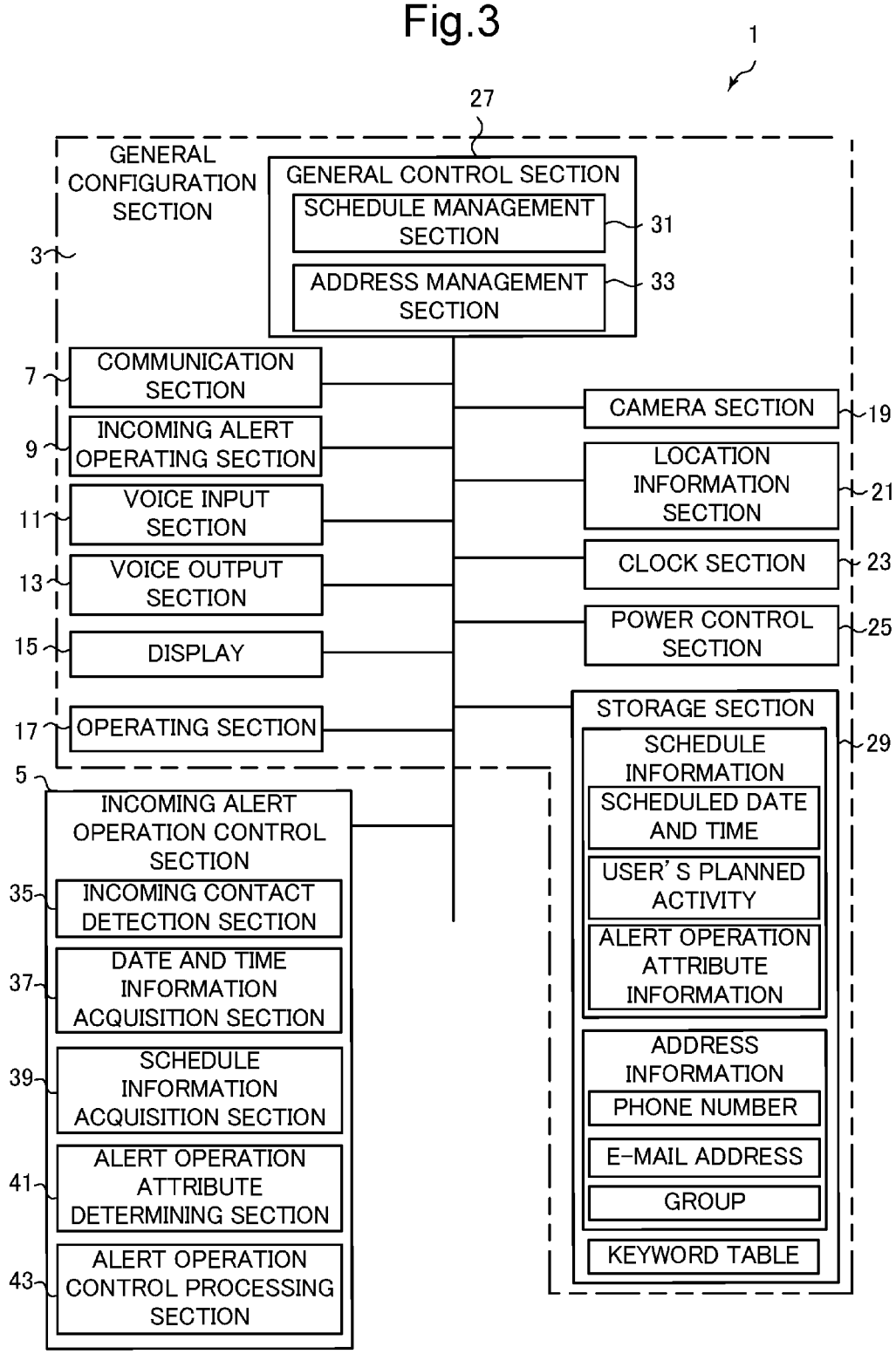
FIG. 3 shows the configuration of a mobile terminal according to Example 2 of the present disclosure.

FIG. 3 shows the configuration of a mobile terminal according to Example 2 of the present disclosure. The configuration of this example is basically identical to that of Example 1.

In the mobile terminal 1 of this example, when there is no alert operation attribute information designated for a piece of schedule information, the alert operation attribute determining section 41 of the incoming alert operation control section 5 performs the processing for determining the alert operation attribute from text data of the user's planned activity.

Specifically, in this example, the storage section 29 previously stores a keyword table. In the keyword table, one alert operation attribute selected from the group consisting of "audio alert", "non-audio alert", and "non-alert" is assigned to each of specific keywords, such as "meeting", "lecture", and "movie", relating to user's planned activities.

The alert operation attribute determining section 41 determines whether or not the text data of the user's planned activity contains any one of the above specific keywords. If the text data contains a specific keyword, the alert operation attribute determining section 41 performs processing for identifying the alert operation attribute assigned to the specific keyword with reference to the keyword table and determining the identified alert operation attribute as the alert operation attribute with which the user's planned activity is associated.

FIG. 4 shows steps of processing for controlling the incoming alert operation in the mobile terminal 1 shown in FIG. 3.

In the processing for controlling the incoming alert operation in the mobile terminal 1 of this example, as shown in FIG. 4, step S21 is added to the flowchart of FIG. 2.

Specifically, if it is determined in step S6 that there is no alert operation attribute information about the piece of schedule information, the process goes to step S21.

In step S21, the processing of "KEYWORD DETECTED?" is executed. Specifically, the alert operation attribute determining section 41 searches for, with reference to the keyword table, any specific keyword in the text data of the user's planned activity in the piece of schedule information acquired in step S5.

When a keyword is searched out, the process goes to step S7 (YES). When no keyword is searched out, the process goes to step S12 (NO).

In the processing in step S7 and subsequent steps, the same processing as in Example 1 is performed based on the alert operation attribute in the keyword table assigned to the keyword searched out in step S21.

As thus far described, in the mobile terminal 1 of this example, the storage section 29 stores a user's planned activity in each piece of schedule information in the form of text data and, if there is no alert operation attribute information designated for the piece of schedule information, the alert operation attribute determining section 41 determines the alert operation attribute from the text data of the user's planned activity.

Therefore, even if there is no alert operation attribute information for a piece of schedule information, the alert operation attribute is not immediately determined to be a default attribute and the mobile terminal 1 can be allowed to perform an incoming alert operation appropriate to the user's situation as long as the alert operation attribute can be determined from the text data of the user's planned activity.

In this example, it is possible to, in setting each piece of schedule information, determine the alert operation attribute from the text data of the user's planned activity and set the determined alert operation attribute information in association with the piece of schedule information. In this case, the processing for controlling the incoming alert operation is the same as in FIG. 2.

Example 3

FIG. 5 shows the configuration of a mobile terminal according to Example 3 of the present disclosure. The basic configuration of this example is the same as that of Example 1.

In the mobile terminal 1 of this example, when the incoming contact having arrived at the terminal is a phone call, the incoming alert operation control section 5 operates as a number acquisition section 45 and a voice response section 47.

The number acquisition section 45 achieves the function of acquiring a phone number to perform processing for acquiring the phone number of an originating terminal notified together with an incoming call signal at the arrival.

The voice response section 47 achieves the function of providing a voice response to perform processing for providing a voice response to the originating terminal having issued the incoming call to notify the originating terminal of the contents of a user's planned activity based on a piece of schedule information acquired by the schedule information acquisition section 39.

In the voice response section 47 in this example, the destinations allowed for voice response thereto are restricted by response attribute information and address information stored in the storage section 29.

The response attribute information is information for use in identifying one or more terminals having phone numbers to be allowed or denied as destinations for response based on the address information. The response attribute information is included in any desired piece of schedule information if designated by the user.

Since the address information in this example is classified in groups according to the terminal attributes of the other terminals, such as their owners or locations of installation, these groups of the address information are used to identify, from the response attribute information in this example, one or more terminals having phone numbers to be allowed or denied as destinations for response. Examples of the response attribute information include "allowed to respond to all", "denied to respond to all", and "allowed to respond to friends".

In providing a voice response, the voice response section 47 identifies a group of originating terminals from the address information with reference to the telephone number acquired by the number acquisition section 45. Then, if the terminals in the identified group are allowed as destinations for response by the response attribute information, the voice response section 47 outputs to the originating terminal the contents of a user's planned activity in a piece of schedule information by voice.

Therefore, the originating user of the originating terminal can recognize the planned activity of the called user of the mobile terminal 1 and determine whether to stop or continue the calling.

For example, if the incoming alert operation of the mobile terminal 1 for an incoming call is in the non-alert mode, the called user fails to be aware of the incoming call, so that the calling of the originating user comes to nothing. Since in Example 3 the originating user can recognize the planned activity of the called user, a useless calling can be stopped.

Furthermore, if the incoming alert operation of the mobile terminal 1 for an incoming call is in the default alert mode, a ring tone of the audio alert may be output despite a situation where the incoming alert operation should be in the non-audio alert or non-alert mode. In this case, the originating user can be led to stop the calling accompanied by the output of a ring tone.

Programs, such as the incoming alert operation control program, described in the above examples may be those stored on a non-transitory computer-readable recording medium, such as a hard disk, a CD-ROM, a DVD-ROM or a semiconductor memory. In such a case, a non-transitory computer-readable recording medium with the control program recorded thereon is one example of the present disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A mobile terminal comprising:
   a storage section including a region capable of storing pieces of schedule information indicating respective schedules of a user in which user's planned activities are assigned to respective scheduled dates and times; and
   one or more processors executing computer-executable instructions stored in the storage section to perform actions comprising:
   (a) an incoming contact detection action that performs processing for detecting an incoming contact having arrived at the user's mobile terminal;
   (b) a date and time information acquisition action that performs processing for acquiring date and time information indicating a current date and time on detection of the incoming contact;
   (c) a schedule information acquisition action that performs processing for acquiring a piece of schedule information at a scheduled date and time based on and corresponding to the acquired date and time information;
   (d) an alert operation attribute determining action that performs processing for determining from the acquired piece of schedule information an alert operation attribute with which the user's planned activity is associated; and
   (e) an alert operation control processing action that performs processing for controlling an incoming alert operation notifying the user of an arrival of the incoming contact according to the determined alert operation attribute,
   wherein the user's planned activity indicates an activity attribute for the user,
   the scheduled date and time indicates the date and time when the activity will be performed in each of the activity attributes;
   the storage section that (1) stores, for each of the user's planned activities, the piece of schedule information containing alert operation attribute information indicating a type or attribute of the incoming alert operation of the mobile terminal, the type or attribute of the incoming alert operation being associated with the individual user's planned activity, (2) stores the user's planned activity in the piece of schedule information in the form of text data, and (3) previously stores a keyword table that contains a plurality of specific keywords relating to the planned activities and a plurality of the alert operation attributes any one of which is associated with each of the plurality of specific keywords; and
   by the alert operation attribute determining action, the one or more processors performs processing for (1) determining the alert operation attribute based on the alert operation attribute information contained in the piece of schedule information, and (2) when there is no alert operation attribute information designated for the piece of schedule information, determining the alert operation attribute from the text data by determining whether or not the text data contains one of the specific keywords and, if the text data contains one of the specific keywords, identifying based on the keyword table the alert operation attribute associated with the specific keyword contained in the text data.

2. The mobile terminal according to claim 1, wherein the one or more processors performs:
by the alert operation attribute determining action, processing for determining which of audio alert, non-audio alert, and non-alert is the alert operation attribute, and
by the alert operation attribute determining action, processing for instructing to perform the incoming alert operation in a mode of the audio alert, the non-audio alert or the non-alert according to the determined alert operation attribute.

3. The mobile terminal according to claim 1, wherein:
the one or more processor executes computer-executable instructions stored in the storage section to perform actions further comprising an address management action that manages pieces of address information of other terminals;
the pieces of address information are classified in groups according to locations of the other terminals; and
by the alert operation attribute determining action, the one or more processor performs changing the alert operation attribute depending upon the locations of installation of originating terminals as the other terminals.

4. A non-transitory computer-readable recording medium storing computer-executable instructions that, when executed on one or more processors, cause the one or more processors to perform actions comprising:
(a) an incoming contact detection action that detects an incoming contact having arrived at a mobile terminal of a user;
(b) a date and time information acquisition action that acquires date and time information indicating a current date and time on detection of the incoming contact;
(c) a schedule information acquisition action that acquires from the storage section a piece of schedule information in which a user's planned activity is assigned to a scheduled date and time based on and corresponding to the acquired date and time information;
(d) an alert operation attribute determining action that determines from the acquired piece of schedule information an alert operation attribute with which the user's planned activity is associated; and
(e) an alert operation control processing action that controls an incoming alert operation notifying the user of an arrival of the incoming contact according to the determined alert operation attribute,
wherein the user's planned activity indicates an activity attribute for the user,
the scheduled date and time indicates the date and time when the activity will be performed in each of the activity attributes;
the storage section that (1) stores, for each of the user's planned activities, the piece of schedule information containing alert operation attribute information indicating a type or attribute of the incoming alert operation of the mobile terminal, the type or attribute of the incoming alert operation being associated with the individual user's planned activity, (2) stores the user's planned activity in the piece of schedule information in the form of text data, and (3) previously stores a keyword table that contains a plurality of specific keywords relating to the planned activities and a plurality of the alert operation attributes any one of which is associated with each of the plurality of specific keywords; and
in the alert operation attribute determining action, processing is performed for (1) determining the alert operation attribute based on the alert operation attribute information contained in the piece of schedule information, and (2) when there is no alert operation attribute information designated for the piece of schedule information, determining the alert operation attribute from the text data by determining whether or not the text data contains one of the specific keywords and, if the text data contains one of the specific keywords, identifying the alert operation attribute associated with the specific keyword contained in the text data.

5. The mobile terminal according to claim 4, wherein:
the one or more processor executes computer-executable instructions stored in the storage section to perform actions further comprising an address management action that manages pieces of address information of other terminals;
the pieces of address information are classified in groups according to locations of the other terminals; and
by the alert operation attribute determining action, the one or more processor performs changing the alert operation attribute depending upon the locations of installation of originating terminals as the other terminals.

* * * * *